United States Patent
Kogiantis et al.

(10) Patent No.: US 6,829,470 B2
(45) Date of Patent: Dec. 7, 2004

(54) PER STREAM RATE CONTROL USING APP DECODING

(75) Inventors: Achilles George Kogiantis, Madison, NJ (US); Ashok N. Rudrapatna, Basking Ridge, NJ (US); Naresh Sharma, Budd Lake, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 383 days.

(21) Appl. No.: 10/118,648

(22) Filed: Apr. 8, 2002

(65) Prior Publication Data

US 2003/0190898 A1 Oct. 9, 2003

(51) Int. Cl.[7] .............................................. H04B 7/02
(52) U.S. Cl. ................... 455/101; 455/67.11; 370/206; 355/341
(58) Field of Search ................................. 455/101, 102, 455/91, 108, 110, 114.2, 114.3, 115.1, 115.3, 116, 118, 126, 450, 452.2, 451, 452.1, 67.11, 63.1, 62, 63.2, 67.13; 370/206, 345, 342, 252; 375/341, 343, 332

(56) References Cited

U.S. PATENT DOCUMENTS

| 5,491,688 | A | * | 2/1996 | Bocci et al. | 370/479 |
| 5,719,871 | A | * | 2/1998 | Helm et al. | 370/479 |
| 6,233,273 | B1 | * | 5/2001 | Webster et al. | 375/148 |
| 6,678,523 | B1 | * | 1/2004 | Ghosh et al. | 455/442 |
| 6,754,169 | B2 | * | 6/2004 | Baum et al. | 370/204 |
| 2003/0072395 | A1 | * | 4/2003 | Jia et al. | 375/341 |
| 2003/0176161 | A1 | * | 9/2003 | Dale et al. | 455/3.01 |

* cited by examiner

*Primary Examiner*—Pablo N. Tran

(57) ABSTRACT

A method for allocating data rate to a stream of information to be transmitted over a communication channel of a communication system is provided. Modified union bounds are used to determine the channel characteristic experienced by each of the streams to select their respective data rates from an MCS that can be handled by the communication channel of the communication system.

5 Claims, 2 Drawing Sheets

PER STREAM RATE CONTROL USING APP DECODING

BACKGROUND OF THE INVENTION

1. Field of the Invention

The present invention generally relates to communication systems and in particular multiple antenna systems.

2. Description of the Related Art

A basic arrangement for communication systems is to have at least one stream transmitting signals to at least one receiver over a communication channel. A key goal in communication systems is to efficiently manage the resources available at the transmitter and receiver. For the stream it is desirable to transmit the communication signals at as high a data rate as the system will allow. Usually the factor that limits the transmission rate is the amount of transmission power that is allocated to the transmitter. Also, because the communication channel is not ideal, errors will be introduced into the signals as they propagate through the communication channel. The communication channel is typically a dynamically time varying system that affects communication signals differently at different times. For the receiver it is desirable to receive the signals with as little error as possible. To reduce the errors as much as possible, the receiver is often designed such that it sends feedback information to the transmitter characterizing the communication channel. The transmitter uses the feedback information to modify its transmit signals to reduce their vulnerability to the anomalies of the communication channel. The feedback information transmitted by the receiver, however, represents additional bandwidth (another system resource) that the system sometimes uses to increase its efficiency. Communication system designers have discovered that if they can determine the characteristic of the channel from the transmitter's point of view, they can allocate the proper amount of data rate or bandwidth and power to the transmitter. A transmitter, which 'sees' a certain channel characteristic, can handle a 'certain data rate.' There is a direct relationship between the channel characteristic and the proper amount of resource allocation (e.g., data rate) such a channel characteristic can handle. Thus, allocating a higher data rate than the 'certain data rate' to that transmitter will cause a portion of the data transmitted by that transmitter to be lost because, based on the channel characteristic, the channel cannot handle the additional data rate. Since no data could be correctly received during this time, the average data rate (defined as the total data correctly received divided by the total time of transmission) becomes smaller, thus lowering the efficiency of the communication system. Conversely, if the transmitter is allocated a lower data rate than the rate it can handle, the transmitter would not be operating efficiently since it can transmit more information that can be correctly received; this is not an efficient use of the available data rate or bandwidth. If, however, the channel characteristic as seen by the transmitter can be determined, then the proper amount of bandwidth and power (or other resources) can be assigned to the transmitter allowing it to operate efficiently. The channel characteristic represents how the channel affects the parameters (e.g., amplitude, phase, frequency) of a transmitted signal. The channel characteristic is typically obtained from measurement of signals after they have propagated through the channel. Because the parameters of the signal are known prior to them being transmitted through the channel and further because the parameters of the signals can be measured after they have propagated through the channel, the effects of the channel on the signals can be easily determined at the receiver and this information can be conveyed back to the transmitter.

In multiple transmitter communication systems with one or more transmitters there could be a plurality of data streams (referred to as stream hereafter) that are transmitted simultaneously. The streams can be part of a transmitted signal or a plurality of transmitted signals from the transmitters. The goal remains to determine the channel characteristic seen by each stream so that the proper amount of one or more resources can be allocated to each stream. System designers use a particular well known filter at the receiver called a Minimum Mean Squared Error (MMSE) filter and determine the channel quality at the output of the MMSE filter to allow them to determine the channel characteristic as seen by each stream and then allocate the proper amount of one or more resources to each stream based on the determined channel characteristic. The receiver has one or more receiving devices (e.g., antennas) for receiving the signals from the streams. The received signal is processed as per the MMSE technique to determine the characteristic of each of the streams. However, even though the MMSE technique allows one to determine the channel characteristic of each of the streams, the MMSE receiver does not provide relatively good performance when compared to APP (A Posteriori Probability) receiver. APP receiver provides better performance than MMSE receiver in that they are able to receive information at a relatively lower error rate than MMSE receivers. However, unlike MMSE, determining the channel characteristic as seen by each transmitter for APP receivers has been a difficult problem and has not been addressed before.

SUMMARY OF THE INVENTION

The present invention provides a method for efficiently allocating one or more resources to at least one stream of a communication system by performing an APP decoding process at a receiver of the communication system capable of receiving signals from the streams over a communication channel. We describe a process to determine the channel characteristic as seen by each stream thus enabling the proper amount of one or more resources to be allocated to each stream of the communication system. The invention determines the channel characteristic per stream by using Modified Union bounds.

A modified union bound for each stream is determined where each modified union bound is a function of the following three parameters: (1) the channel matrix as seen by the receiver; (2) the transmit power of the signals from the stream and (3) the variance of the noise in the communication channel assuming that the noise follows Gaussian statistics and has zero mean. A Q(x) function is used to determine the modified union bounds where x represents a combination of the three parameters. Modified union bounds provide an upper bound probability of error ($P_e$) value of any particular symbol transmitted for a particular stream. Modified union bounds are based on union bounds, which is a well known technique that is used in communication system determine an upper bound the probability of error for the collection of symbols transmitted simultaneously in the streams. A transmitted symbol of any particular stream is drawn from a constellation of symbols. A probability of symbol error vs. SNR (Signal to noise ratio) curve is generated for the symbol constellation of a particular stream assuming an Additive White Gaussian Noise (AWGN) channel. SNR is the ratio of the signal power to the noise power.

Probability of error versus SNR curves can be obtained by well-known numerical methods and/or statistics. The calculated upper bound probability of error value ($P_e$) using modified union bounds is applied to the probability of symbol error vs. SNR curve to obtain an SNR value. This SNR value is used to determine a proper data rate for that stream where the data rate is one or more resources that desirably are to be efficiently allocated amongst the streams. The system can choose to transmit the using a set of symbols in accordance with any one of various members of a Modulation and Coding Set (MCS). Each member of the MCS has associated with it a modulation scheme and an error correcting coding scheme. In essence, each member of the MCS defines a particular data rate. Further, each member of the MCS is associated with or can generate a particular set of coded symbols or codewords. A probability of codeword error vs. SNR curve for AWGN channel is generated yielding a set of such curves. The SNR value calculated from the probability of symbol error vs. SNR is applied to the set of curves (probability of codeword error vs. SNR) and the MCS that gives the highest data rate while keeping the probability of error small is chosen for that particular stream. The above process can be repeated for each of the streams allowing the data rate to be calculated for each stream with the APP decoding. Therefore, the appropriate data rate (or other resource) for any stream can be individually determined allowing efficient use of communication system resources.

DETAILED DESCRIPTION

Figure 1:
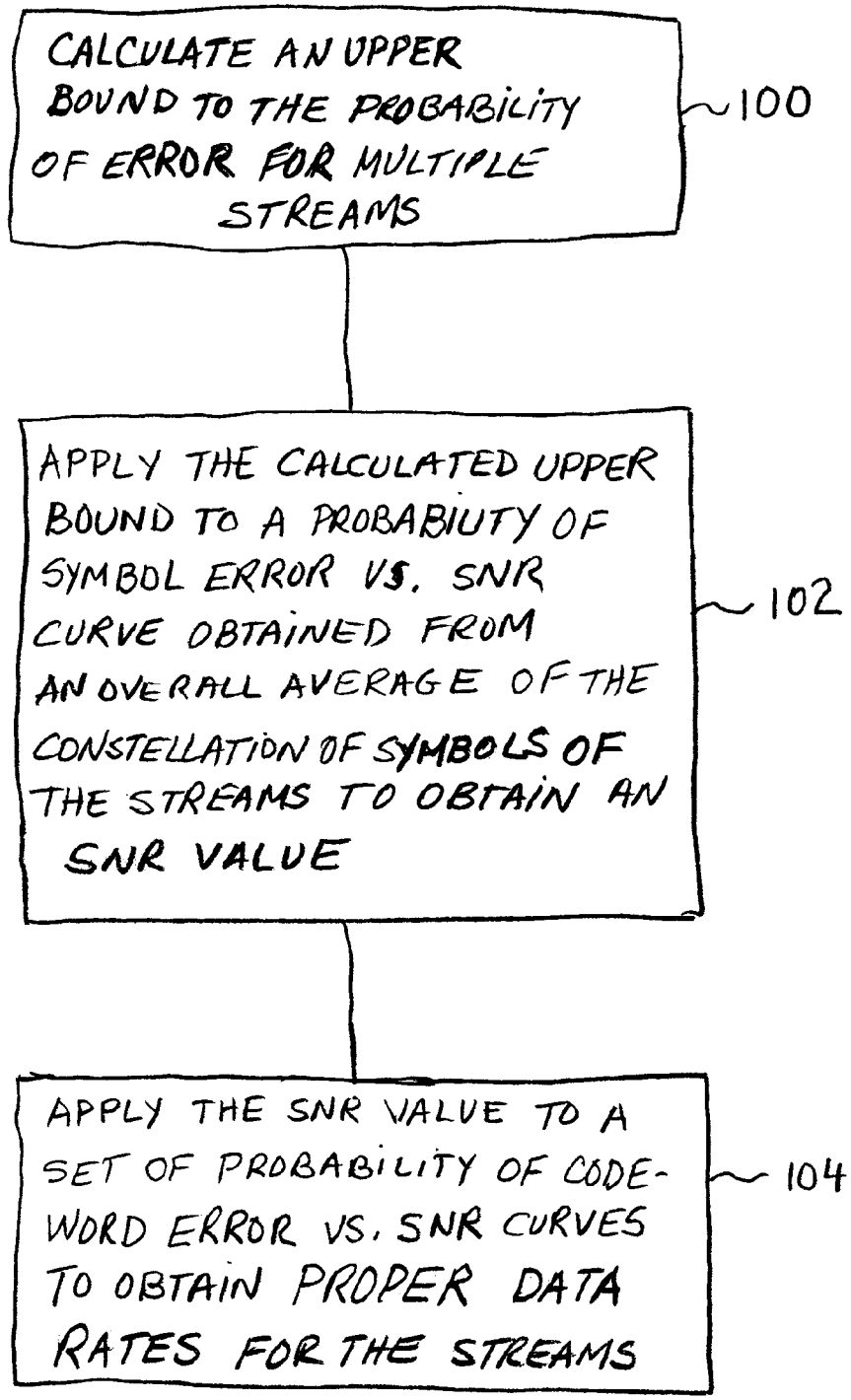
FIG. 1 depicts a flow chart of the method of the present invention.

The present invention provides a method for efficiently allocating one or more resources to at least one stream of a communication system by performing an APP decoding process at a receiver of the communication system capable of receiving signals from the streams over a communication channel. We describe a process to determine the channel characteristic as seen by each stream thus enabling the proper amount of one or more resources to be allocated to each stream of the communication system. The invention determines the channel characteristic per stream by using Modified Union bounds.

A modified union bound for each stream is determined where each modified union bound is a function of the following three parameters: (1) the channel matrix as seen by the receiver; (2) the transmit power of the signals from the stream and (3) the variance of the noise in the communication channel assuming that the noise follows Gaussian statistics and has zero mean. A Q(x) function is used to determine the modified union bounds where x represents a combination of the three parameters. Modified union bounds provide an upper bound probability of error ($P_e$) value of any particular symbol transmitted for a particular stream. Modified union bounds are based on union bounds, which is a well known technique that is used in communication systems determine an upper bound on the probability of error for the collection of symbols transmitted simultaneously in the streams. A transmitted symbol of any particular stream is drawn from a constellation of symbols. A probability of symbol error vs. SNR (Signal to noise ratio) curve is generated for the symbol constellation of a particular stream assuming an Additive White Gaussian Noise (AWGN) channel. SNR is the ratio of the signal power to the noise power. Probability of error versus SNR curves can be obtained by well-known numerical methods and/or statistics. The calculated upper bound probability of error value ($P_e$) using modified union bounds is applied to the probability of symbol error vs. SNR curve to obtain an SNR value. This SNR value is used to determine a proper data rate for that stream where the data rate is one or more resources that desirably are to be efficiently allocated amongst the streams. The system can choose to transmit the using a set of symbols in accordance with any one of various members of a Modulation and Coding Set (MCS). Each member of the MCS has associated with it a modulation scheme and an error correcting coding scheme. In essence, each member of the MCS defines a particular data rate. Further, each member of the MCS is associated with or can generate a particular set of coded symbols or codewords. A probability of codeword error vs. SNR curve for AWGN channel is generated yielding a set of such curves. The SNR value calculated from the probability of symbol error vs. SNR is applied to the set of curves (probability of codeword error vs. SNR) and the MCS that gives the highest data rate while keeping the probability of error small is chosen for that particular stream. The above process can be repeated for each of the streams allowing the data rate to be calculated for each stream with the APP decoding. Therefore, the appropriate data rate (or other resource) for any stream can be individually determined allowing efficient use of communication system resources.

For ease of discussion, the method of the present invention will be discussed in the context of a 2×2 antenna system where two transmit antennas are transmitting to two receive antennas over a communication channel having a channel matrix, H. The channel matrix is a well known parameter that characterizes the overall channel between a transmitter and receiver. It should be noted however that the method of the present invention is not limited to antennas or any special type of transmitter device. Further, the method of the present invention is essentially a per stream rate control method in which the origin of a signal stream is not of any consequence and the type of communication system within which the stream is propagating is not of any consequence. Typically, the stream consists of coded symbols that are formed by coding channel bits into symbols by digital modulation and the channel bits are formed from coding information bits by channel coding. In general, the streams are transmitted through multiple transmitters (e.g., antennas) over a communication channel having a channel matrix, H. The method of the present invention is applicable to both flat fading and frequency selective channels.

The streams are then further coded by a linear or non-linear space-time block code. The space-time block code transmits coded symbols or codewords from transmit antennas by combining coded symbols from one or more streams at a given time. The combining operation could be linear or non-linear. A special case of a linear space-time block code could be to transmit each stream from a different transmit antenna if the number of streams is equal to the number of transmit antennas. In most cases, it is possible to represent the effect of linear space-time block code and channel matrix by an appropriate matrix that the streams would effectively see as the channel matrix before reaching the receiver.

Referring to FIG. 1, there is shown a flow chart of the method of the present invention. In step 100, an upper bound for the probability of error is calculated for a stream by calculating a modified union bound for a stream as follows: in general for an M transmit, N receive antenna system, there is a corresponding N×M channel matrix. In the specific example being discussed M=N=2 and let the linear space-time block code be the special case as described above where the two streams are directly transmitted from the transmit antennas. Let there be a total of L distinct vector symbols that can be used by the stream at any given time. For M streams, a vector symbol is a vector consisting of the symbols of the M streams at a given time. This number L is a function of modulations used by the transmit antennas. For example, if QPSK (Quadrature Phase Shift Keying) and 16 QAM (Quadrature Amplitude Modulation) are used for streams 1 and 2 respectively in a 2-transmit antenna system, then L is 64. The union bound enables us to calculate an upper bound to the probability of error by using pair-wise probability of error for which analytical expressions are indeed available. The expression for calculating the probability of error of a symbol transmitted from the jth (j=1, 2 . . . M) stream is given as $$P_e(j) \le \frac{1}{L} \sum_s \sum_{c, c_j \ne s_j} P(c, s),$$

where the summation is taken over all the vector symbols s and c. P(c,s) denotes the probability of error when vector symbol s is transmitted and is erroneously decoded as vector symbol c assuming that there are only two possible vector symbols c and s that can be transmitted. Vector symbols and $c_j$ and $s_j$ denote the jth elements of c and s respectively. In the above equation, for any s, one can work only with a few vector symbols c instead of all, that have high P(c,s). The expression for the pair-wise probability of error is easily obtained as $$P(c, s) = Q\left(\sqrt{\frac{\|H\Lambda(c - s)\|^2}{2MN_0}}\right),$$

where $\Lambda$ indicates a real diagonal matrix such that the square of the sum of its diagonal elements equals the total transmit power of the streams, H is a 2×2 channel matrix and Q is a well known mathematical function commonly used in communication theory. The Q function is given by:

$$Q(x) = \frac{1}{\sqrt{2\pi}} \int_x^\infty e^{-u^2/2} du$$

In the above expression, it is also assumed that the noise at each receive antenna is I.I.D. (Independent and identically distributed) Gaussian with zero mean and variance $N_0$. If the noise is not Gaussian and I.I.D., one could still in principle compute modified union bounds to get an upper bound on the probability on a per stream basis by using the statistical properties of the noise.

It is possible that the probability of symbol error as computed above by the modified union bound technique is greater than one. In such a situation, the computed probability of error is clipped (or limited) to a value equal to or less than 1. The Q-function can be implemented as a lookup table containing a plurality of Q(x) values for a plurality of x values.

In step 102, the probability of error upper bound value is applied to a probability of symbol vs. SNR curve generated from an overall average of the entire constellation of the symbols being transmitted by the stream. In generating this curve it is assumed that the channel is Additive White Gaussian Noise (AWGN; Gain of 1, non-varying and the noise is assumed to be Gaussian and two noise samples taken at different times are independent). An SNR value is obtained when the probability of error upper bound value is applied to the curve.

In step 104, the SNR value obtained from step 102 is applied to a set of probability of codeword error vs. SNR curves for an AWGN channel. Each stream is transmitted as per a selected member of the MCS. The probability of codeword error curve is obtained in a well known fashion from a Modulation Coding Set (MCS). Again the channel is assumed to be AWGN. An example of an MCS set is shown below:

| Modulation | Code Rate | Information Bits/Symbol |
|---|---|---|
| QPSK | 1/2 | 1 |
| QPSK | 3/4 | 1.5 |
| 16QAM | 1/2 | 2 |
| 16QAM | 3/4 | 3 |

Figure 2:
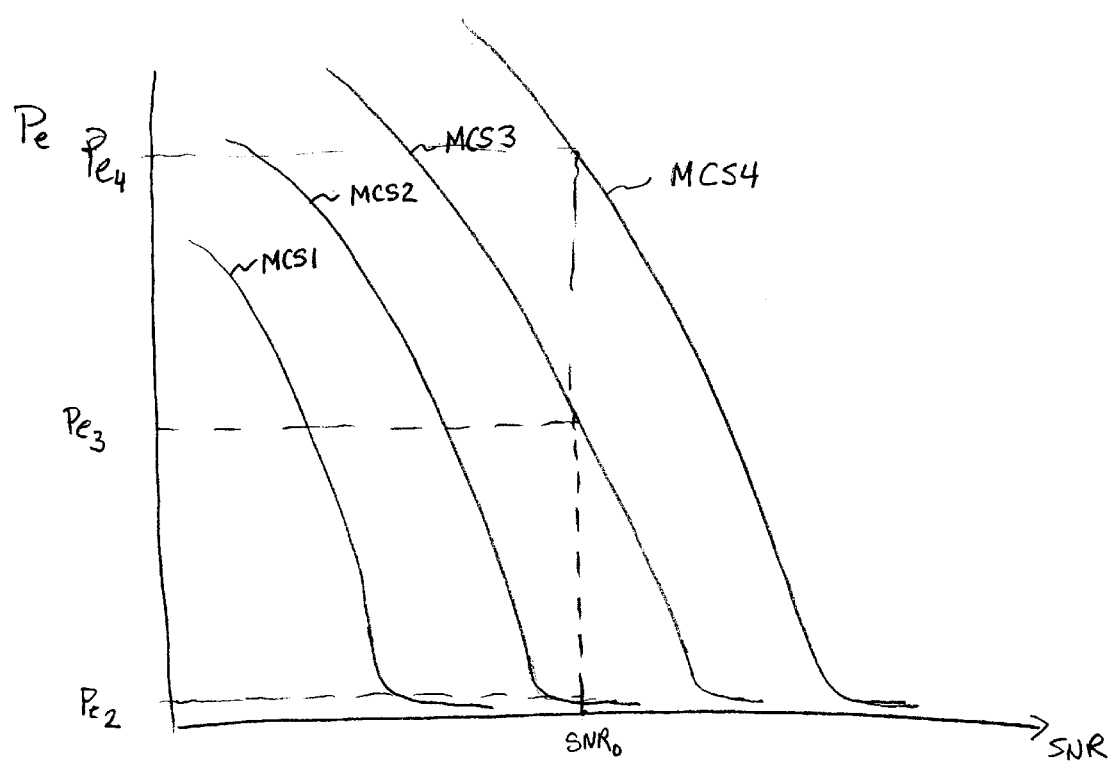
FIG. 2 shows a probability of codeword error vs. SNR curve for four members of an MCS being used by a communication system applying the method of the present invention.

The MCS essentially defines data rates associated with particular modulation schemes and coding schemes. Coding is a technique in which redundancy is introduced in a stream of information to protect the information from noise. When a symbol from a stream of information is transmitted as per the modulation and coding of a member of an MCS, a codeword results. The probability of codeword error vs. SNR curve thus is an overall average of the entire set of possible codewords of the MCS members. Referring to FIG. 2, suppose the SNR value obtained from step 102 is $SNR_0$. Using the probability of codeword error vs. SNR curves, the corresponding probability of errors $P_{e0}$ and $P_{e1}$ are obtained from curves MCS 3 and MCS4. Note that the number of curves, which have a corresponding probability of error value for $SNR_0$ depends on the distribution of the various curves for the MCS with respect to $SNR_0$. An MCS member is selected by applying the SNR value obtained from step 102 to any and all of the curves of the MCS and selecting the curve that yields the highest data rate while keeping the probability of error relatively small (say smaller than a pre-decided value). In the example shown in FIG. 2, the calculated $SNR_0$ value intersects curves MCS4, MCS3 and MCS2 curves yielding probability of errors $P_{e4}$, $P_{e3}$ and $P_{e2}$ respectively. Although curve MCS4 appears to have a higher data rate than curve MCS3, curve MCS3 would probably be chosen because $P_{e3}$ appears to be significantly less than $P_{e4}$. Even though MCS2 has an even smaller probability of error, it would not be chosen because MCS2 has a data rate smaller than MCS3's data rate. The goal is to keep the probability of error relatively small while keeping the data rate as large as possible.

In an alternative embodiment of the method of the present invention, the streams are passed through a matrix, G, at the transmitter after they are space-time coded. Matrix G is chosen from a pre-defined set of matrices and the receiver chooses G from this set and conveys its choice to the transmitter through a feedback channel. The effective channel as seen by the transmitter now becomes HG (i.e. matrix H multiplied by matrix G) and the receiver chooses the G that maximizes the data rate that can be reliably supported by the effective channel. The channel seen by the transmitter is thus advantageously altered to improve the data rate that can be supported reliably.

We claim:

1. A method of allocating a data rate to multiple streams of information that are to be transmitted through multiple transmitters over a communication channel of a communication system, the method comprising the step of:

applying SNR values to probability of codeword error vs. SNR curves to select a particular member of a MCS having a particular data rate and a probability of codeword error value thus selecting the data rates to be allocated to the streams where the SNR values are obtained from applying an upper bound on the probability of error value for the streams to a probability of symbol error vs. SNR curve that is based on an overall average of a set of symbols used in the streams.

2. The method of claim 1 where the streams are transmitted by transmit antennas of the communication system.

3. The method of claim 1 where the streams are further coded by a space-time block code and then transmitted by transmit antennas of the communication system.

4. The method of claim 1 where the upper bound on the probability of error value is obtained by calculating a modified union bound from the channel matrix, properties of channel noise statistics and power associated with the streams.

5. The method of claim 1 where the streams are passed through a matrix G before transmission effectively changing the channel matrix as seen by the streams to HG where G is a predefined matrix selected so as to enable the channel to handle higher data rates.

* * * * *